US010996691B2

United States Patent
Nakano et al.

(10) Patent No.: US 10,996,691 B2
(45) Date of Patent: May 4, 2021

(54) PRESSURE REDUCING VALVE DEVICE

(71) Applicants: JTEKT CORPORATION, Osaka (JP); TOYOTA JIDOSHA KABUSHIKI KAISHA, Toyota (JP)

(72) Inventors: Akira Nakano, Okazaki (JP); Toshikatsu Kubo, Obu (JP); Shota Yamamato, Toyota (JP); Akira Yamashita, Toyota (JP); Yutaka Hotta, Toyota (JP); Eiji Okawachi, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/801,903

(22) Filed: Nov. 2, 2017

(65) Prior Publication Data
US 2018/0136672 A1 May 17, 2018

(30) Foreign Application Priority Data
Nov. 15, 2016 (JP) .............................. JP2016-222385

(51) Int. Cl.
*F16K 31/12* (2006.01)
*G05D 16/10* (2006.01)
(Continued)

(52) U.S. Cl.
CPC ....... *G05D 16/10* (2013.01); *B60K 15/03519* (2013.01); *F16K 31/1221* (2013.01);
(Continued)

(58) Field of Classification Search
CPC .............................................. Y10T 137/7826
See application file for complete search history.

(56) References Cited

U.S. PATENT DOCUMENTS 1,832,863 A * 11/1931 Hewitt .................... B60T 17/18
303/1
1,961,589 A * 6/1934 Kearny .................. G05D 16/10
137/505.35
(Continued)

FOREIGN PATENT DOCUMENTS

CN      101080593 A    11/2007
CN      201715057 U     1/2011
(Continued)

OTHER PUBLICATIONS

Oct. 11, 2019 Office Action issued in Chinese Patent Application No. 201711090269.3.
(Continued)

*Primary Examiner* — Robert K Arundale
(74) *Attorney, Agent, or Firm* — Oliff PLC

(57) ABSTRACT

A pressure reducing valve device includes a first body; a second body; a valve mechanism accommodated in the first body, and including a valve seat and a valve element; and a piston that is accommodated in the second body, defines a pressure reducing chamber, and is configured to move in accordance with a pressure in the pressure reducing chamber so as to move the valve element. The first body is connected to an inner portion of a connection portion having a bottomed cylindrical shape. The connection portion is provided in the second body to protrude outward. The valve seat is held between the first body and the second body in a direction in which the first body and the second body are attached to each other such that the valve seat is fixed in a flow passage.

7 Claims, 3 Drawing Sheets

(51) Int. Cl.
*F16K 31/122* (2006.01)
*B60K 15/035* (2006.01)
*B60K 15/03* (2006.01)

(52) U.S. Cl.
CPC ....... *F16K 31/1223* (2013.01); *G05D 16/107* (2019.01); *B60K 2015/03296* (2013.01); *Y10T 137/7826* (2015.04)

(56) References Cited

U.S. PATENT DOCUMENTS

| | | | | |
|---|---|---|---|---|
| 2,674,829 | A * | 4/1954 | St Clair | G05D 16/0663 137/505.42 |
| 2,731,975 | A * | 1/1956 | Boals | G05D 16/10 137/116.5 |
| 3,113,756 | A * | 12/1963 | Griffo | F16K 31/1266 251/57 |
| 3,139,902 | A * | 7/1964 | Thomas | G05D 16/0619 137/224 |
| 3,699,998 | A * | 10/1972 | Baranowski, Jr. | G05D 16/0663 137/327 |
| 3,926,204 | A * | 12/1975 | Earl | G05D 16/02 137/116.5 |
| 5,159,952 | A * | 11/1992 | Ono | B05B 12/088 137/505.41 |
| 5,285,810 | A * | 2/1994 | Gotthelf | B60K 15/03006 137/340 |
| 5,443,083 | A | 8/1995 | Gotthelf | |
| 2004/0149336 | A1* | 8/2004 | Wiederkehr | F16K 1/306 137/505.11 |
| 2009/0308465 | A1 | 12/2009 | Suzuki et al. | |
| 2010/0133460 | A1* | 6/2010 | Durant | G05D 16/0666 251/359 |
| 2011/0114867 | A1 | 5/2011 | Suzuki et al. | |
| 2014/0158237 | A1 | 6/2014 | Haneda et al. | |
| 2016/0118676 | A1 | 4/2016 | Shima et al. | |
| 2019/0063615 | A1* | 2/2019 | Lampton | F16K 15/026 |

FOREIGN PATENT DOCUMENTS

| | | |
|---|---|---|
| CN | 103867893 A | 6/2014 |
| CN | 204553968 U | 8/2015 |
| JP | H05-113828 A | 5/1993 |
| JP | H08-334182 A | 12/1996 |
| JP | 2009-301506 A | 12/2009 |
| JP | 2011-108057 A | 6/2011 |
| JP | 2011-158052 A | 8/2011 |
| JP | 2013-206360 A | 10/2013 |
| JP | 2016-085627 A | 5/2016 |
| JP | 2016-136304 A | 7/2016 |
| WO | 2006/064627 A1 | 6/2006 |

OTHER PUBLICATIONS

May 12, 2020 Office Action issued in Japanese Patent Application No. 2016-222385.

Sep. 3, 2020 Office Action issued in Chinese Patent Application No. 201711090269.3.

\* cited by examiner

PRESSURE REDUCING VALVE DEVICE

INCORPORATION BY REFERENCE

The disclosure of Japanese Patent Application No. 2016-222385 filed on Nov. 15, 2016 including the specification, drawings and abstract is incorporated herein by reference in its entirety.

BACKGROUND

1. Technical Field

The disclosure relates to a pressure reducing valve device.

2. Description of Related Art

In the related art, Japanese Patent Application Publication No. 2011-108057 (JP 2011-108057 A) discloses a pressure reducing valve device in which, a valve seat is held between a valve seat fixing member and a diameter-decreased portion of a housing and a valve stem is accommodated in a through-hole of the valve seat fixing member.

In the above-described pressure reducing valve device, a valve element and a tapered distal end portion of the valve stem contact each other in a region that is surrounded by a through-hole of the valve seat and a through-hole of the diameter-decreased portion of the housing. An end portion of the valve stem contacts a piston, the end portion being located on a side opposite to the valve element. The piston is urged toward the valve stem by an elastic force of a piston spring. The valve element and the valve stem move in an axial direction of the pressure reducing valve device due to a pressure difference between a pressure adjusting chamber and a pressure reducing chamber and the elastic force of the piston spring, and thus, the valve element is seated on and separated from the valve seat.

SUMMARY

There is a demand for reduction in size, particularly in axial length of the pressure reducing valve device in order to achieve space saving in a unit such as a vehicle in a case where the pressure reducing valve device is installed in the unit. However, there is a limit in reducing the axial length of the pressure reducing valve device.

The disclosure provides a pressure reducing valve device with a reduced axial length.

An aspect of the disclosure relates to a pressure reducing valve device. The pressure reducing valve device includes a first body including a gas inlet; a second body connected to a downstream portion of the first body, the second body including a gas outlet; a valve mechanism that is accommodated in the first body and is configured to open and close a flow passage between the gas inlet and the gas outlet the valve mechanism including a valve seat and a valve element; and a piston that is accommodated in the second body, defines a pressure reducing chamber communicating with the gas outlet, and is configured to move in accordance with a pressure in the pressure reducing chamber so as to move the valve element. The first body is connected to an inner portion of a connection portion having a bottomed cylindrical shape. The connection portion is provided in the second body to protrude outward. The valve seat is held between the first body and the second body in a direction in which the first body and the second body are attached to each other such that the valve seat is fixed in the flow passage.

In the pressure reducing valve device, the valve mechanism is accommodated in the first body, and the connection portion having the bottomed cylindrical shape is provided in the second body to protrude outward. At least a portion of the first body is inserted in the connection portion of the second body such that the first body and the second body are connected to each other. Thus, the valve mechanism and the connection portion overlap each other in an axial direction. In addition, the valve seat is held between the first body and the second body in the direction in which the first body and the second body are attached to each other such that the valve seat is fixed. Thus, the valve seat is positioned at the distal end of the first body. Therefore, it is possible to shorten the axial length of the entire pressure reducing valve device.

A through-hole extending through the valve seat and a communication hole extending through a bottom portion of the connection portion of the second body may be provided as a portion of the flow passage such that the through-hole and the communication hole are continuous with each other in a gas flowing direction; and a rod portion may be provided integrally with the valve element, the rod portion may have an outside diameter smaller than inside diameters of the communication hole and the through-hole, and the rod portion may be inserted through the communication hole and the through-hole such that the rod portion contacts the piston.

In the configuration, a gas flowing into the first body reaches the gas outlet through the through-hole of the valve seat, the communication hole of the second body, and the pressure reducing chamber in the second body. In this case, the narrowest portion of the flow passage for the gas is positioned between the inner peripheral surfaces of the through-hole of the valve seat and the communication hole of the second body and the outer peripheral surface of the rod portion of the valve element.

Since the rod portion is provided integrally with the valve element, a joint or the like that is an obstacle hindering the flow of gas is not present. Therefore, when a gas flows into a gas flow passage between the inner peripheral surfaces of the through-hole of the valve seat and the communication hole of the second body and the outer peripheral surface of the rod portion of the valve element, a turbulent gas flow is not generated and the smooth gas flow is maintained. Accordingly, the gas flows smoothly and thus it is possible to suppress occurrence of vibration or noise.

A tapered surface may be provided to define a downstream end portion of the communication hole, the tapered surface having a diameter increasing toward the pressure reducing chamber. In the configuration, since the tapered surface is provided to define the communication hole of the second body, the tapered surface having the diameter increasing toward the pressure reducing chamber, it is possible to increase a gas flow rate, for the following reason. The thickness of a bottom wall of the second body is decreased, by providing the tapered surface to define the communication hole, and thus, the axial length of a gas flow passage formed between the inner peripheral surface of the communication hole and the outer peripheral surface of the rod portion of the valve element is shortened, and a gas flow passage formed between the tapered surface defining the communication hole and the outer peripheral surface of the rod portion is enlarged.

An end surface of the piston may be provided with a spherical surface portion, and the rod portion may contact the spherical surface portion, the end surface of the piston being located on a side of the valve mechanism. In the configuration, since the spherical surface portion and the rod portion are in point contact with each other, even if the piston is inclined with respect to an axis of the pressure reducing valve device when the piston is urged toward the bottom wall of the second body by an urging member in the second body, a direction of a force from the piston that presses the rod portion is constantly parallel to the axis of the pressure reducing valve device. Therefore, even if the piston is inclined with respect to the axis of the pressure reducing valve device, it is possible to restrain the valve element from being inclined wife respect to the axis of the pressure reducing valve device.

According to the above aspect of the disclosure, it is possible to provide the pressure reducing valve device with the reduced axial length.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a pressure reducing valve device according to a first embodiment will be described. The pressure reducing valve device is a piston type pressure reducing valve device, which is installed in a fuel cell vehicle. The pressure reducing valve device reduces the pressure of a high-pressure hydrogen gas supplied from a fuel tank to a low pressure and supplies the hydrogen gas to a fuel cell.

Figure 1:
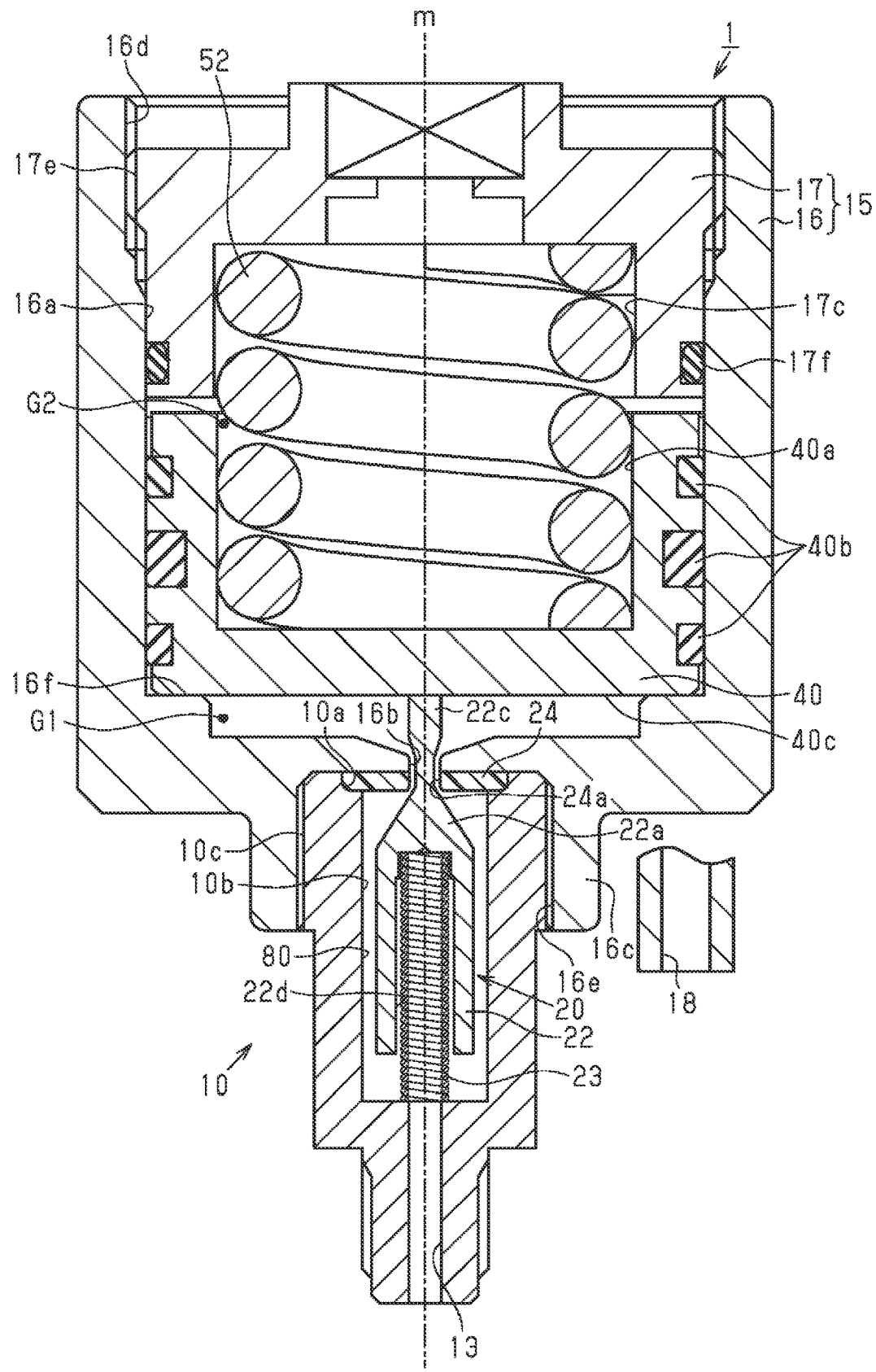
FIG. 1 is a sectional view partially illustrating a sectional configuration of a pressure reducing valve device according to a first embodiment.

As illustrated in FIG. 1, a pressure reducing valve device 1 includes a first body 10, a piston 40, a second body 15, and a valve mechanism 20, as main components. The first body 10 and the second body 15 are screwed to each other in the axial direction of the first body 10 and the second body 15. The valve mechanism 20 is accommodated in the first body 10.

The first body 10 is configured to function as a joint to which a pipe is connected. The first body 10 includes a primary port 13 as a gas inlet connected to the fuel tank, a valve seat accommodation hole 10a that opens toward a side opposite to the primary port 13, and a valve accommodation hole Mb through which the valve seat accommodation hole 10a and the primary port 13 communicate with each other. The primary port 13, the valve seat accommodation hole 10a, and the valve accommodation hole 10b are provided on the same axis m. A bottom surface of the valve accommodation hole 10b opens toward the primary port 13. The inside diameter of the valve accommodation hole 10b is set to be smaller than the inside diameter of the valve seat accommodation hole 10a. The valve mechanism 20 is accommodated in the valve accommodation hole 10b. A screw groove 10c is provided on the outer peripheral surface of an end portion of the first body 10, the end portion being located on a side of the valve seat accommodation hole 10a.

The second body 15 includes a cylinder 16 and a cover 17. The cylinder 16 has a bottomed cylindrical shape. The cylinder 16 includes a secondary port 18 as a gas outlet that is connected to a fuel cell via a pipe (not shown). The cylinder 16 includes a cylinder forming hole 16a that opens toward a side opposite to a bottom wall of the cylinder 16, a bottomed cylindrical connection portion 16c that protrudes outward from the bottom wait of the cylinder 16, and a communication hole 16b that extends through a bottom portion of the connection portion 16c (the bottom wall of the cylinder 16). The inside diameter of the cylinder forming hole 16a is set to be larger than the inside diameter of the communication hole 16b. The inside diameter of the connection portion 16c is set to be larger than the inside diameter of the communication hole 16b and is almost equal to the outside diameter of the first body 10.

The inside of the cylinder forming hole 16a and the inside of the connection portion 16c communicate with each other via the communication hole 16b. A screw groove 16d is provided on the inner peripheral surface of an opening end (the upper side in FIG. 1) of the cylinder forming hole 16a. A screw groove 16e is provided on the inner peripheral surface of the connection portion 16c. The screw groove 10c of the first body 10 is screwed to the screw groove 16e.

The cover 17 has a bottomed tubular shape. The cover 17 includes a first piston spring accommodation hole 17c. The outside diameter of the cover 17 is set to be substantially equal to the inside diameter of the cylinder forming hole 16a of the cylinder 16. A screw groove 17e is provided on the outer peripheral surface of a bottom wall portion of the cover 17. A seal member 17f is provided on the outer peripheral surface of a portion of the cover 17, the portion being located on the side of an opening of the cover 17. As the seal member 17f, for example, an O-ring is used. Since the seal member 17f is provided, air-tightness between the cylinder 16 and the outside is secured.

An opening end of the cover 17 is fitted into the cylinder forming hole 16a. The screw groove 17e of the cover 17 is screwed to the screw groove 16d of the cylinder 16. In the cylinder 16, the piston 40 is accommodated between the bottom wall of the cylinder 16 and the bottom wall of the cover 17. The piston 40 has a bottomed tubular shape. The piston 40 includes a second piston spring accommodation hole 40a that opens toward the cover 17. A wear ring and a seal member 40b are provided on the outer peripheral surface of the piston 40. The seal member is disposed on the central position in the axial direction and a lip seal is used as the seal member, for example. Since the seal member is provided, air-tightness between the cylinder 16 and the outside is secured. The outer peripheral surface of the piston 40 slides with respect to the inner peripheral surface of the cylinder 16. In the cylinder 16, a pressure reducing chamber G1 is defined by being surrounded by a bottom surface 40c of the piston 40 and an inner surface of the cylinder 16. The pressure reducing chamber G1 communicates with the secondary port 18. In the cylinder 16, a piston spring 52 as an urging member is accommodated between an inner bottom surface of the cover 17 and an inner bottom surface of the piston 40. The piston spring 52 is accommodated in a state in which the piston spring 52 is compressed. Due to an elastic force of the piston spring 52, the piston 40 is urged toward the bottom wall of the cylinder 16 (toward the valve mechanism 20). In addition, movement of the piston 40 toward the bottom wall of the cylinder 16 is restricted when a bottom wall of the piston 40 contacts a step portion 16*f* that is provided on an inner bottom portion of the second body 15. In a state where the bottom wall of the piston 40 contacts the step portion 16*f*, a gap is formed between the bottom wall of the piston 40 and the bottom wall of the cylinder 16. A pressure adjusting chamber G2 is defined between the first piston spring accommodation hole 17*c* and the second piston spring accommodation hole 40*a*, and the pressure adjusting chamber G2 is opened to the outside air.

Next, the valve mechanism 20 will be described. The valve mechanism 20 opens and closes a flow passage between the primary port 13 and the secondary port 18, The valve mechanism 20 includes a valve element 22, a valve spring 23, and a valve seat 24 as illustrated in FIG. 1.

Figure 2:
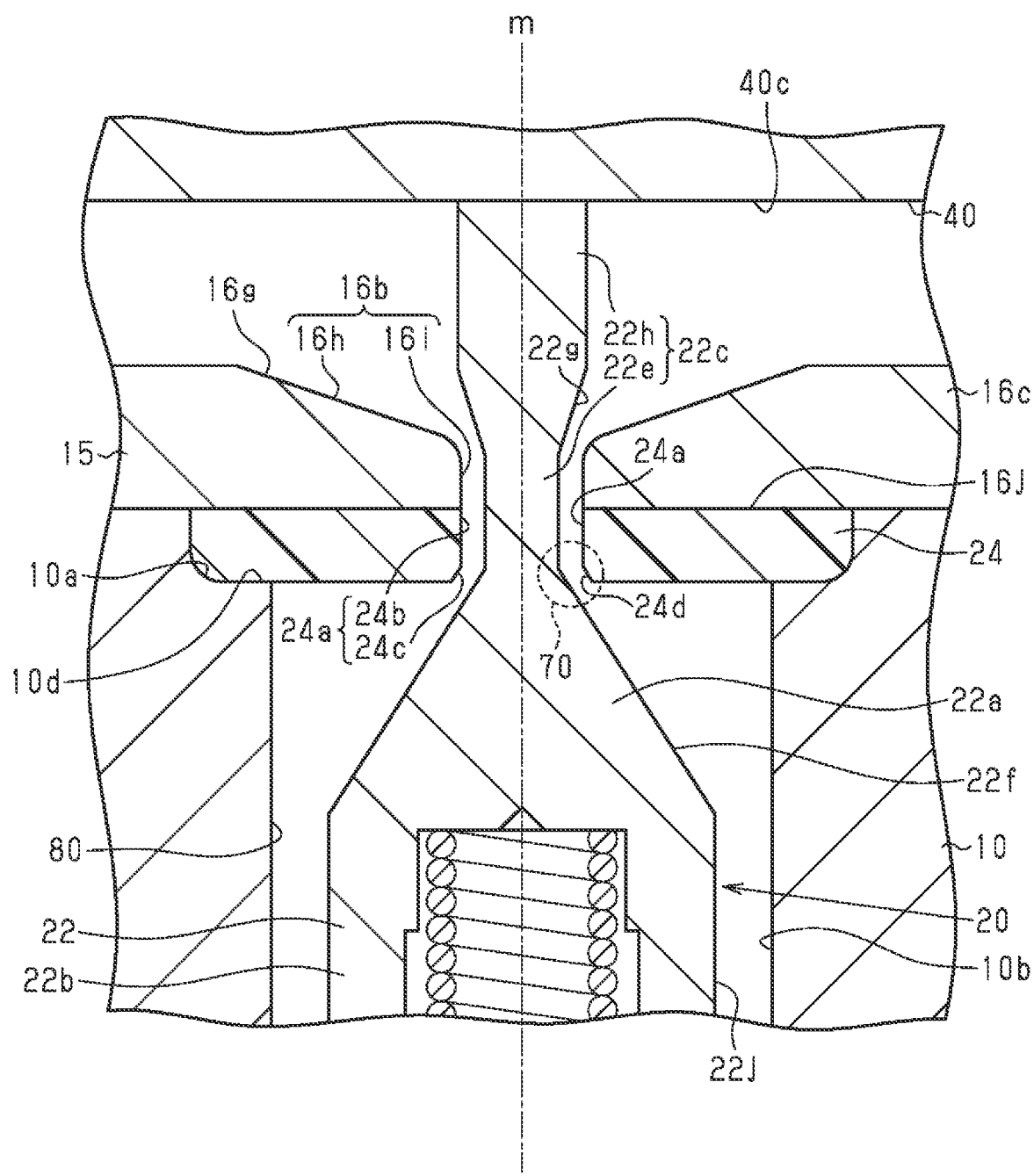
FIG. 2 is a sectional view illustrating a sectional configuration of a rod portion of a valve element and components in the vicinity of the rod portion in the pressure reducing valve device according to the first embodiment.

As illustrated in FIG. 2, the valve seat 24 is an annular resin member including a cylindrical through-hole 24*a* that extends through the central portion of the valve seat 24. The valve seat 24 is fitted to an inner peripheral surface of the valve seat accommodation hole 10*a*. The outer peripheral edge of the valve seat 24 is held between a bottom surface 10*d* of the valve seat accommodation, hole 10*a* and a bottom surface 16*j* of the connection portion 16*c* of the second body 15 in a direction in which the first body 10 and the second body 15 are attached to each other. Each of the through-hole 24*a* and the communication hole 16*b* of the second body 15 functions as a gas flow passage. The through-hole 24*a* and the communication hole 16*b* are provided on the same axis m such that the through-hole 24*a* and the communication hole 16*b* are continuous with each other in a gas flowing direction. The through-hole 24*a* is divided into a diameter-equalized portion 24*b* a diameter-increased, portion 24*c* that are arranged in, the stated order in a direction from the piston 40. The inside diameter of the diameter-equalized portion 24*b* is equal to the inside diameter of the communication hole 16*b* of the second body 15. The diameter-increased portion 24*c* includes a tapered surface 24*d* having an inside diameter gradually increasing toward the valve element 22 from the diameter-equalized portion 24*b*.

The valve element 22 includes a main body portion 22*b* and a contact portion 22*a* as a distal end portion. The contact portion 22*a* is provided on an end portion of the main body portion 22*b*, the end portion being located on the side of the valve seat 24. The contact portion 22*a* includes a tapered surface 22*f* having a diameter gradually increasing toward the main body portion 22*b*. The inclination of the tapered surface 22*f* with respect to the axis m is the same as the inclination of the tapered surface 24*d* of the diameter-increased portion 24*c* of the valve seat 24 with respect to the axis m. A columnar rod portion 22*c* is formed on a distal end of the contact portion 22*a*. The outside diameter of the entire rod portion 22*c* is set to be smaller than the minimum inside diameter of the through-hole 24*a* and the communication hole 16*b*. The rod portion 22*c* is inserted through the through-hole 24*a* and the communication hole 16*b*. A gap formed between the outer peripheral surface of the rod portion 22*c* and the inner peripheral surfaces of the through-hole 24*a* and the communication hole 16*b* functions as a gas flow passage.

Figure 4:
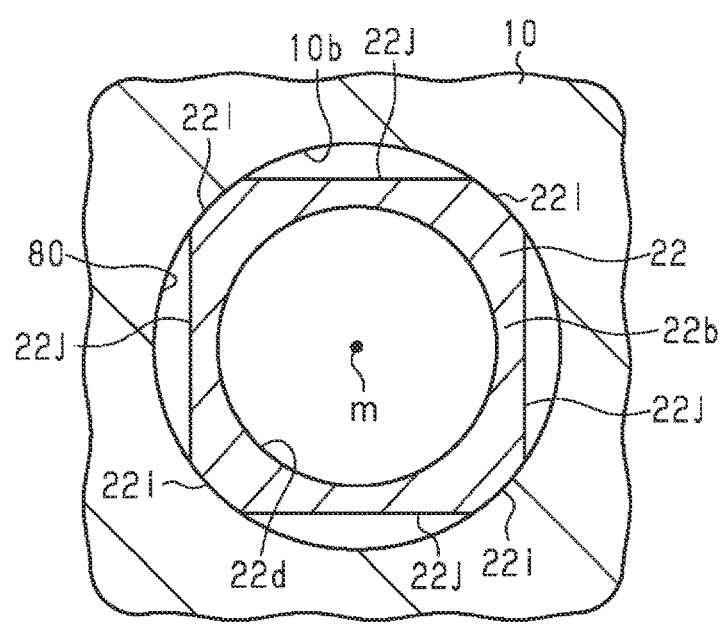
FIG. 4 is a sectional view illustrating a sectional configuration of the valve element of the pressure reducing valve device according to the first embodiment.

As illustrated in FIG. 4, a sectional shape of the main body portion 22*b* that is obtained by cutting the main body portion 22*b* in a direction orthogonal to the axial direction of the valve element 22 is substantially quadrangular. The outer surface of the main body portion 22*b* is provided with four sliding surfaces 22*i* and four flow passage forming surfaces 22*j*. Each sliding surface 22*i* is a sliding portion and a distance between each sliding surface 22*i* and the axis m is substantially equal to the radius of the valve accommodation hole 10*b* of the first body 10. A distance between each flow passage forming surface 22*j* and the axis m is smaller than the radius of the valve accommodation hole 10*b*. The sliding surfaces 22*i* and the flow passage forming surfaces 22*j* are alternately provided in a peripheral direction of the valve element 22. Each of four gaps that axe formed between the flow passage forming surfaces 22*j* of the valve element 22 and the inner peripheral surface of the valve accommodation hole 10*b* functions as an outer introduction passage 80 that is a gas flow passage. In addition, in the main body portion 22*b*, a spring hole 22*d* that opens at an end portion opposite to the rod portion 22*c* is provided.

As illustrated in FIG. 1, the valve spring 23 is accommodated between a bottom surface of the spring hole 22*d* of the valve element 22 and a bottom surface of the valve accommodation hole 10*b* of the first body 10. The valve spring 23 is accommodated in a state in which the valve spring 23 is compressed. Due to an elastic force of the valve spring 23, the valve element 22 is urged toward the valve seat 24. A distal end of the rod portion 22*c* contacts the bottom surface 40*c* of the piston 40 such that movement of the valve element 22 toward the valve seat 24 is restricted.

Next, a configuration of the rod portion 22*c* of the valve element 22 will be described in detail. As illustrated in FIG. 2, the rod portion 22*c* of the valve element 22 includes a supporting portion 22*b* and a diameter-decreased portion 22*e*. The supporting portion 22*h* is connected to the contact portion 22*a* of the valve element 22 via the diameter-decreased portion 22*e*. The outside diameter of the supporting portion 22*h* is set to be smaller than the inside diameter of the through-hole 24*a* of the valve seat 24 and the communication hole 16*b* of the second body 15. The outside diameter of the diameter-decreased portion 22*e* is set to be smaller than the outside diameter of the supporting portion 22*h*. In the valve element 22, an end of the supporting portion 22*h* is provided with a tapered surface 22*g* that is connected to the diameter-decreased portion 22*e*. The diameter of the rod portion 22*c* gradually decreases toward the diameter-decreased portion 22*e* from the supporting portion 22*h*. The diameter-decreased portion 22*e* is positioned radially inward of the through-hole 24*a* of the valve seat 24 and the communication hole 16*b* of the second body 15. The supporting portion 22*h* contacts the bottom surface 40*c* of the piston 40. The communication hole 16*b* of the second body 15 is divided into a diameter-increased portion 16*h* and a diameter-equalized portion 16*i* that are arranged in the stated order in a direction from the piston 40. The inside diameter of the diameter-equalized portion 16*i* is equal to the inside diameter of the diameter-equalized portion 24*b* of the through-hole 24*a* of the valve seat 24. The diameter-increased portion 16*h* is defined by a tapered surface 16*g* having an inside diameter gradually increasing toward the piston 40 from the diameter-equalized portion 16*i*. The inclination of the tapered surface 16*g* with respect to the axis m is set to be larger than the inclination, of the tapered surface 22*g* with respect to the axis m.

Here, a method of setting the size of the outside diameter of the diameter-decreased portion 22*e*, and the inclination of the tapered surface 22*g* and the inclination of the tapered surface 16*g* will be described. As illustrated in FIG. 1, a hydrogen gas supplied to the primary port 13 flows to the plurality of outer introduction passages 80 between the inner peripheral surface of the valve accommodation hole 10*b* and the outer peripheral surface of the valve element 22, the gap formed between the outer peripheral surface of the rod portion 22*c* and the inner peripheral surfaces of the through-hole 24a and the communication hole 16b, the pressure reducing chamber G1, and the secondary port 18 in the stated order.

As illustrated in FIG. 2, in the pressure reducing valve device 1, when the pressure of a high-pressure hydrogen gas is reduced to a predetermined pressure, the pressure of the hydrogen gas is adjusted based on a sectional area of a throttle portion 70 as a gas flow passage formed between the tapered surface 22f of the valve element 22 and the tapered surface 24d of the valve seat 24, the sectional area being obtained by cutting the gas flow passage in a direction orthogonal to the gas flow passage. In a gas flow passage located downstream of the throttle portion 70 and extending from the valve seat 24 to the pressure reducing chamber G1 (the gap between the outer peripheral surface of the rod portion 22c and the inner peripheral surfaces of the through-hole 24a and the communication hole 16b), the outside diameter of the diameter-decreased portion 22e, and the inclination of the tapered surface 22g and the inclination of the tapered surface 16g with respect to the axis m are set such that a sectional area of the gas flow passage that is obtained by cutting the gas flow passage in a direction orthogonal to the gas flow passage is larger than the sectional area of the gas flow passage of the throttle portion 70 regardless of whether the valve mechanism 20 is in an open state or a closed state.

For the tapered surface 16g, there are more points to consider, A portion of the bottom portion of the connection portion 16c receives a high pressure from the hydrogen gas via the valve seat 24, the portion contacting the valve seat 24. Therefore, in consideration of the durability of the portion of the bottom portion of the connection portion 16c that contacts the valve seat 24, the inclination of the tapered surface 16g with respect to the axis m is set such that the thickness of the bottom portion of the connection portion 16c is not excessively small.

Note that, an expression "the valve mechanism 20 is accommodated in the first body 10" means that the valve element 22 is in the first body 10 in a state in which the rod portion 22c protrudes out of the first body 10 as illustrated in FIG. 1.

Next, the operation of the pressure reducing valve device 1 will be described. The pressure reducing valve device 1 is in an open state at an initial stage. As illustrated in FIG. 1, in the pressure reducing valve device 1, a high-pressure hydrogen gas supplied from the fuel tank to the primary port 13 is guided into the valve accommodation hole 10b of the first body 10. The hydrogen gas flowing into the valve accommodation hole 10b flows into each of the plurality of outer introduction passages 80 formed between the outer surface of the valve element 22 and the inner peripheral surface of the valve accommodation hole 10b. When the valve mechanism 20 is in an open state, the hydrogen gas flowing into the outer introduction passages 80 passes through the through-hole 24a of the valve seat 24 and the communication hole 16b of the second body 15 and is guided into the pressure reducing chamber G1. Thereafter, the hydrogen gas guided into the pressure reducing chamber G1 is supplied to the fuel cell via the secondary port 18.

Since the hydrogen gas is supplied from the fuel tank to the pressure reducing valve device 1, the inner pressure of the pressure reducing chamber G1 rises. A force that is applied the piston 40 due to a pressure difference between the inner pressure of the pressure reducing chamber G1 and the inner pressure of the pressure adjusting chamber G2 acts against an urging force of the piston spring 52 and thus the piston 40 moves toward the cover 17 (i.e., the piston 40 moves in an upward direction in FIG. 1). The valve element 22 moves toward the piston 40 in accordance with the above-described movement of the piston 40. Then, the contact portion 22a of the valve element 22 contacts the valve seat 24 such that the through-hole 24a of the valve seat 24 is closed. That is, the valve mechanism 20 is brought to a closed state. As a result, supply of the hydrogen gas to the pressure reducing chamber G1 is stopped and thus the inner pressure of the pressure reducing chamber G1 is reduced as the hydrogen gas is consumed in the fuel cell located downstream of the secondary port 18. When a force pushing the piston 40 upward (a force in a direction toward the cover 17 in FIG. 1) that is generated due to the pressure difference between the inner pressure of the pressure reducing chamber G1 and the inner pressure of the pressure adjusting chamber G2 is smaller than the urging force of the piston spring 52, the piston 40 moves in a direction toward the step portion 16f of a bottom portion of the cylinder 16. At tins time, an urging force of the valve spring 23 is so small that the urging force can be ignored. When the valve element 22 moves toward the bottom surface of the valve accommodation hole 10b in accordance with the movement of the piston 40, the contact portion 22a of the valve element 22 moves away from the valve seat 24. That is, the valve mechanism 20 is brought to the open state. As a result, the hydrogen gas is supplied to the pressure reducing chamber G1 again and thus the inner pressure of the pressure reducing chamber G1 rises. The pressure reducing valve device 1 reduces the pressure of a high-pressure hydrogen gas that is supplied from the fuel tank, via the primary port 13 to the predetermined pressure and supplies the pressure-reduced hydrogen gas to the fuel cell via the secondary port 18 by repeating the opening and closing operations of the valve mechanism 20 as described above.

As described above, with the pressure reducing valve device according to the embodiment, it is possible to achieve the following operations and effects. (1) In the pressure reducing valve device 1, the valve mechanism 20 is accommodated in the first body 10, and the second body 15 (the bottom wall of the cylinder 16) is provided with the bottomed cylindrical connection portion 16c protruding outward. A portion of the first body 10 is inserted in the connection portion 16c of the second body 15 such that the first body 10 and the second body 15 are connected to each other. Thus, the valve mechanism 20 and the connection portion 16c overlap each other in an axial direction. In addition, the valve seal 24 is held between the first body 10 (the bottom surface 10d of the valve seat accommodation hole 10a) and the second body 15 (the bottom surface 16j of the connection portion 16c) in the axial direction such that the valve seat 24 is fixed. Thus, the valve seat 24 is positioned at the distal end of the first body 10 (the distal end on the side of the second body 15). Therefore, it is possible to shorten the axial length of the entire pressure reducing valve device 1. Furthermore, it is possible to position the valve mechanism 20, particularly the valve seat 24, as close to the second body 15 (more specifically, the piston 40) as possible. This is obvious since a valve seat fixing member (70) and a valve stem (72) in JP 2011-108057 A are not used.

Therefore, in a case where the pressure reducing valve device 1 is installed in a vehicle, it is possible to decrease the size of a space required for mounting the pressure reducing valve device 1 in the vehicle. Thus, the mount-ability of the pressure reducing valve device 1 in the vehicle is improved (in other words, the pressure reducing valve device 1 can be mounted in the vehicle more easily). In addition, since the valve seat 24 and the valve element 22 can be disposed closer to the piston 40, moisture contained in a hydrogen gas becomes likely to flow into the pressure reducing chamber G1. That is, since the length of a flow passage between the throttle portion 70 and the pressure reducing chamber G1 is shortened, it is possible to reduce the possibility that the moisture contained in the gas returns to the outer introduction passages 80 surrounded by the outer surface of the valve element 22 and the inner peripheral surface of the valve accommodation hole 10b of the first body 10 without flowing to the pressure reducing chamber G1 (i.e., to the downstream side) after passing through the throttle portion 70. Thus, it is possible to reduce the possibility that the moisture is accumulated and frozen, in the outer introduction passages 80.

(2) It is known that a gas flow becomes turbulent and vibration and noise in the pressure reducing valve device 1 are likely to occur in a case where an obstacle that hinders the gas flow is present in a gas flow passage. In this regard, in the pressure reducing valve device 1, the rod portion 22c of the valve element 22 is provided integrally with the valve element 22 and the outer peripheral surface of the rod portion 22c smoothly and continuously extends. Therefore, when a hydrogen gas flows into a gap between the inner peripheral surfaces of the through-hole 24a of the valve seat 24 and the communication hole 16b of the second body 15 and the outer peripheral surface of the rod portion 22c of the valve element 22, the gas flow is restrained from being turbulent. Accordingly, the gas flows more smoothly and thus it is possible to suppress occurrence of vibration and noise in the pressure reducing valve device 1.

(3) In the through-hole 24a of the valve seat 24 and the communication hole 16b of the second body 15, the diameter-decreased portion 22e of the rod portion 22c of the valve element 22 is provided. Therefore, it is possible to enlarge a gas flow passage between the inner peripheral surfaces of the through-hole 24a and the communication hole 16b and the outer peripheral surface of the rod portion 22c. Accordingly, it is possible to increase a gas flow rate.

(4) The tapered surface log is provided to define the diameter-increased portion 16h of the communication hole 16b in the bottom wall of the second body 15 the tapered surface 16g having an inside diameter gradually increasing toward the piston 40 from the diameter-equalized portion 16i of the communication hole 16b. Thus, it is possible to further increase a gas flow rate in the gas flow passage between the inner peripheral surfaces of the through-hole 24a of the valve seat 24 and the communication, hole 16b of the second body 15 and the outer peripheral surface of the rod portion 22c of the valve element 22, for the following reason. The thickness of the bottom wall of the second body 15 is decreased by providing the tapered surface 16g to define the communication hole 16b, and thus, the axial length of a gas flow passage formed between the inner peripheral surface of the diameter-equalized portion 16i of the communication hole 16b and the outer peripheral surface of the diameter-decreased portion 22e of the rod portion 22c of the valve element 22 is shortened, and a gas flow passage formed between the tapered surface 16g defining the diameter-increased portion 16h of the communication hole 16b and the outer peripheral surface of the rod portion 22c (or the tapered surface 22g of the rod portion 22c) is enlarged. As the axial length of the diameter-decreased portion 22e of the rod portion 22c of the valve element 22 becomes longer, the rigidity of the rod portion 22c becomes lower, and the rod portion 22c is more likely to be deformed. However, since the tapered surface 16g is provided to define the communication hole 16b in the bottom wall of the second body 15, the thickness of the bottom wall of the second body 15 becomes small and thus it is possible to shorten the axial length of the gas flow passage formed between the inner peripheral surface of the diameter-equalized portion 16i of the communication hole 16b and the outer peripheral surface of the diameter-decreased portion 22e of the rod portion 22c of the valve element 22. Thus, it is possible to maintain a gas flow rate when the axial length of the diameter-decreased portion 22e of the rod portion 22c is shortened in accordance with reduction in length of the gas flow passage. Accordingly, it is possible to improve the durability of the valve element 22 while maintaining a gas flow rate.

Hereinafter, a second embodiment of the pressure reducing valve device will be described. Basically, the pressure reducing valve device according to the second embodiment has the same configuration as that in the first embodiment illustrated in FIGS. 1, 2, and 4. However, the second embodiment is different from the first embodiment in the configuration of the bottom surface 40c of the piston 40 (i.e., an end surface on the side of the valve mechanism 20). Thus, the same components as those in the first embodiment will be denoted by the same reference numerals and detailed description thereof will be omitted.

Figure 3:
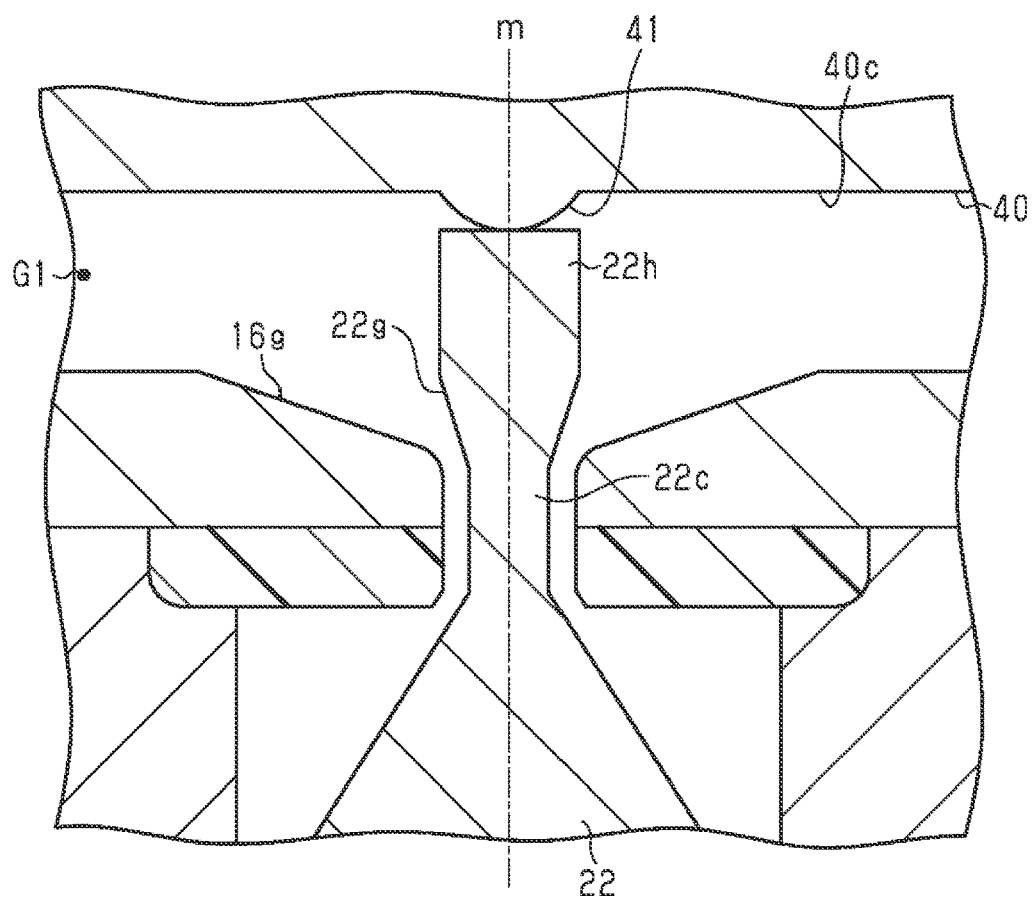
FIG. 3 is a sectional view partially illustrating a sectional configuration of a pressure reducing valve device according to a second embodiment.

As illustrated in FIG. 3, the bottom surface 40c of the piston 40 is provided with a semi-spherical projecting portion 41 that is a spherical surface portion. The projecting portion 41 contacts the supporting portion 22h of the rod portion 22c of the valve element 22.

According to the second embodiment, it is possible to achieve the following effect in addition to effects (1) to (4) in the first embodiment. (5) in the cylinder 16, the piston 40 and the bottom surface of the piston 40 may be inclined with respect to the axis m when the piston 40 is urged by an elastic force of the piston spring 52.

In this regard, since the projecting portion 41 and the supporting portion 22h of the rod portion 22c are in point contact with each other, a direction of a force from the piston 40 that presses the rod portion 22c is constantly parallel to the axis m of the pressure reducing valve device 1. Therefore, even if the piston 40 is inclined with respect to the axis m, it is possible to restrain the valve element 22 from being inclined with respect to the axis m.

Note that, the first and second embodiments may be modified as follows as long as there is no technical inconsistency. In the second embodiment, the bottom surface of the piston 40 is provided with the semi-spherical projecting portion 41. However, the disclosure is not limited to this configuration. For example, the entire bottom surface of the piston 40 may have a semi-spherical shape. Even in this case, since the bottom surface of the piston 40 and the supporting portion 22h of the rod portion 22c of the valve element 22 are in point contact, it is possible to restrain the valve element 22 from being inclined with respect to the axis m.

In the first and second embodiments, the tapered surface 16g is provided to define the communication hole 16b of the bottom wall of the second body 15. However, the tapered surface 16g may be omitted. In addition, in the first and second, embodiments, the rod portion 22c of the valve element 22 is provided with the diameter-decreased portion 22e. However, the diameter-decreased portion 22e may be omitted. In this case, the tapered surface 22g may be also omitted and the rod portion 22c may be a rod-shaped member having a constant outside diameter. However, in this case as well, in the gas flow passage formed between the inner peripheral surface of the communication hole 16b and the outer peripheral surface of the rod portion 22c of the valve element 22, the outside diameter of the rod portion 22c is adjusted such that a sectional area of the gas flow passage that is obtained by cutting the gas flow passage in a direction orthogonal to the gas flow passage becomes larger than a sectional area of the flow passage of the throttle portion 70 regardless of whether the valve mechanism 20 is in an open state or a closed state, in consideration of pressure adjustment of the pressure reducing valve device 1.

In the first and second embodiments, the rod portion 22c is provided integrally with the contact portion 22a of the valve element 22. However, the disclosure is not limited to this configuration. For example, the rod portion 22c may be funned separately from the contact portion 22a of the valve element 22. In this case, an outer surface of the contact portion 22a and an outer surface of the rod portion are formed to smoothly and continuously extend at a joint between the contact portion 22a of the valve element 22 and the rod portion formed separately from the contact portion 22a.

What is claimed is:

1. A pressure reducing valve device comprising:
a first body including a gas inlet;
a second body connected to a downstream portion of the first body, the second body including a gas outlet;
a valve mechanism accommodated in the first body, the valve mechanism being configured to open and close a flow passage between the gas inlet and the gas outlet, the valve mechanism including a valve seat and a valve element; and
a piston accommodated in the second body, the piston defining a pressure reducing chamber communicating with the gas outlet, the piston being configured to move in accordance with a pressure in the pressure reducing chamber so as to move the valve element, wherein:
the first body is at least partially inserted into the second body in a connection portion of the second body, the first body being connected to an inner portion of the connection portion in an axial direction, which has a bottomed cylindrical shape, the connection portion protruding outward in the axial direction from a relatively upstream portion of the second body, and the connection portion forming an opening into which the first body and the valve mechanism are inserted, and the connection portion protruding inward in a radial direction from a radially outer portion of the second body, a portion of the first body and a portion of the valve element protruding outside of the connection portion at an axial upstream free end of the second body formed by the connection portion,
the valve seat is held between the first body and the second body in the axial direction in which the first body and the second body are attached to each other, the valve seat being encompassed by the first body on an outer peripheral edge of the valve seat in the radial direction and by the connection portion of the second body on an inner axial side of the valve seat in the axial direction, such that the valve seat is fixed in the flow passage,
a through-hole extending through the valve seat and a communication hole extending through a bottom portion of the connection portion of the second body are provided as a portion of the flow passage, such that the through-hole and the communication hole are continuous with each other in the axial direction, which is a direction that the gas flows,
a rod portion is provided integrally with the valve element, the rod portion having an outside diameter smaller than an inside diameter of the communication hole and an inside diameter of the through-hole, and the rod portion is inserted through the communication hole and the through-hole such that the rod portion contacts the piston,
an end surface of the piston has a spherical surface portion, and
the rod portion contacts the spherical surface portion, the end surface of the piston being located on a side of the valve mechanism.

2. The pressure reducing valve device according to claim 1, wherein a tapered surface defines a downstream end portion of the communication hole, the tapered surface having a diameter that increases toward the pressure reducing chamber.

3. The pressure reducing valve device according to claim 1, wherein:
the rod portion includes a supporting portion and a diameter-decreased portion; and
an outside diameter of the diameter-decreased portion is smaller than an outside diameter of the supporting portion.

4. The pressure reducing valve device according to claim 1, wherein:
the gas inlet is disposed at the portion of the first body protruding outside of the connection portion.

5. The pressure reducing valve device according to claim 1, wherein:
the gas inlet extends coaxially with the valve mechanism.

6. The pressure reducing valve device according to claim 1, wherein:
the gas inlet is disposed at a first axial end of the first body, and the valve seat is disposed at a second axial end of the first body opposite from the first axial end.

7. A pressure reducing valve device comprising:
a first body including a gas inlet;
a second body connected to a downstream portion of the first body, the second body including a gas outlet;
a valve mechanism accommodated in the first body, the valve mechanism being configured to open and close a flow passage between the gas inlet and the gas outlet, the valve mechanism including a valve seat and a valve element; and
a piston accommodated in the second body, the piston defining a pressure reducing chamber communicating with the gas outlet, the piston being configured to move in accordance with a pressure in the pressure reducing chamber so as to move the valve element, wherein:
the first body is at least partially inserted into the second body in a connection portion of the second body, the first body being connected to an inner portion of the connection portion in an axial direction, which has a bottomed cylindrical shape, the connection portion protruding outward in the axial direction from a relatively upstream portion of the second body, and the connection portion forming an opening into which the first body and the valve mechanism are inserted, and the connection portion protruding inward in a radial direction from a radially outer portion of the second body, a portion of the first body and a portion of the valve element protruding outside of the connection portion at an axial upstream free end of the second body formed by the connection portion, the valve seat is held between the first body and the second body in the axial direction in which the first body and the second body are attached to each other, the valve seat being encompassed by the first body on an outer peripheral edge of the valve seat in the radial direction and by the connection portion of the second body on an inner axial side of the valve seat in the axial direction, such that the valve seat is fixed in the flow passage, and the valve element includes a plurality of sliding surfaces and a plurality of flow passage forming surfaces, each of the plurality of sliding surfaces arranged to slide against an inner peripheral surface of the first body, each of the plurality of flow passage forming surfaces defining a side of a respective flow passage between the first body and the valve element.

* * * * *